3,163,633
METHOD FOR THE MANUFACTURE OF POLY-FUNCTIONAL DIAZONIUM HALIDES
Hartmut Steppan, Wiesbaden-Dotzheim, and August Rebenstock and Wilhelm Neugebauer, Wiesbaden-Biebrich, Germany, assignors, by mesne assignments, to Azoplate Corporation, Murray Hill, N.J., a corporation of New Jersey
No Drawing. Filed July 18, 1961, Ser. No. 124,786
Claims priority, application Germany, Jan. 25, 1961, K 42,719
4 Claims. (Cl. 260—141)

This invention relates to a method for recovering the condensation products of diphenylamine-4-diazonium salts with formaldehyde whereby the condensation products, i.e. polyfunctional diazonium salts, are obtained as metal salt free halides, especially chlorides or bromides.

It is known to the art to prepare polyfunctional diazonium salts by condensing, in the presence of mineral acids, diphenylamine-4-diazonium salts with compounds containing carbonyl groups. In most cases, condensation has been effected with formaldehyde in a sulphuric acid medium; however, hydrochloric acid has also been mentioned for this purpose. The usefulness of the compounds so produced is restricted, however, since the solubility thereof in organic solvents and in water is frequently inadequate.

The condensation products of the prior art are usually isolated as metal halide double salts, primary zinc chloride double salts. Isolation of these compounds in the form of diazo sulfonate compounds and diazonium sulfates is also known.

In accordance with the present invention, a method is provided for recovering condensation products of substituted or unsubstituted diphenylamine-4-diazonium salts with formaldehyde whereby the condensation products, i.e., polyfunctional diazonium salts, are obtained as metal salt free halides especially chlorides or bromides. In this method, the diphenylamine-4-diazonium salts are condensed with formaldehyde and the condensation product is then diluted; metal compounds, which convert the sulfate ions and sulfuric acid into metal sulfates of low solubility, as well as a sufficient amount of halide ions, providing the metal compound is not a halide, are then added in order to form the halides of the condensation product. The solutions of the halide condensation products so obtained are then evaporated to dryness after separation from the metal salts which have precipitated. It may be advantageous to effect the evaporation process under vacuum.

The condensation is effected in concentrated sulphuric acid according to known methods. The diphenylamine-4-diazonium salt employed is preferably a sulfate since both the chloride and the bromide lose a large portion of their anions as hydrohalide during condensation in concentrated sulfuric acid. The sulfuric acid mixture is then diluted with water or a lower aliphatic alcohol, e.g. methanol, or with a water-alcohol mixture to which is then added a sufficient quantity of barium chloride or barium bromide in order to precipitate the sulfuric acid and sulfate ions. Thereafter, the precipitated portions of the mixture are separated off and the strongly acid filtrate, which is free of barium and sulfate ions, is evaporated to dryness, preferably under vacuum.

In a variation of the method, the main portion of the sulfuric acid used as a condensation medium is separated prior to the addition of the barium halide. The mixture is diluted, preferably with isopropanol, whereupon the alcohol dissolves the main portion of the acid, while the sulfate of the condensation product precipitates or remains undissolved. The sulfate is then dissolved in water after pouring off the alcoholic solution and is converted into the halide according to the method described above.

Alternatively, there may be added to the sulfuric acid condensation mixture, diluted with a lower aliphatic alcohol such as methanol, chloride ions or bromide ions in an amount equivalent to the diazonium groups, preferably in the form of barium chloride or barium bromide. Then, the sulfuric acid is precipitated at normal or slightly elevated temperatures by the addition of carbonates of metals of the second group of the periodic system, preferably calcium carbonate, and the solution obtained, after separation from the precipitated salts, is evaporated to dryness under vacuum.

Condensation products of diphenylamine-4-diazonium salts with formaldehyde form, with excess acid, acid salts of the general formula $ArN_2X \cdot HX$, in which Ar is a condensed diphenylamine unit. After evaporation of the solvent, a residue remains consisting of neutral or acid salts of the condensation product or mixtures of both types of salts, depending upon the kind and amount of the acid present. For example, if all of the sulfuric acid used for condensation is precipitated by the addition of barium chloride or barium bromide, acid salts or mixtures of neutral and acid salts are obtained after evaporation of the filtrate. If, however, only the calculated amount of halide ions is added and the sulfuric acid removed, e.g., with calcium carbonate, the neutral salts of the condensation products are obtained after evaporation of the solvents.

The polyfunctional diazonium halides made according to this invention are free of metal salts and consist of brown to brownish-green solids, which can be easily stored and shipped. They are highly useful as dyestuff intermediates.

The invention will be further illustrated by the following specific examples:

*Example I*

To 50 parts by volume of sulfuric acid (78% by weight) are added, while stirring, over a period of 1 hour, 23 parts by weight of diphenylamine-4-diazonium sulfate and then, over a period of 4 hours, 2.4 parts by weight of paraformaldehyde. The mixture is stirred for 2 hours at a temperature of 40° C. and then permitted to stand for a period of 12 hours at room temperature. 50 parts by weight of this mixture are dissolved in 75 parts by volume of water and to this solution a saturated aqueous barium bromide solution is added until no further precipitation of barium sulfate occurs. The mixture is then diluted with 200 parts by volume of methanol and so adjusted that neither a surplus of barium nor sulfate ions is present. To separate the barium sulfate, the mixture is centrifuged and the solvent is completely evaporated under vacuum at a temperature not exceeding 70° C. The yield is 8.8 parts by weight of the acid bromide of the condensation product.

*Example II*

50 parts by weight of the sulfuric acid raw condensate, prepared as described in Example I above, are blended with a solution of 5.2 parts by weight of barium bromide in 20 parts by volume of water and the mixture is thereafter diluted with 150 parts by volume of methanol. 45 parts by weight of calcium carbonate are added and stirred at a temperature of 40° C. until the mixture has attained a pH of approximately 6. The precipitated salts, barium sulfate and calcium sulfate, are then filtered off. The filtrate is purified by treatment with 5 parts by weight of charcoal and completely evaporated at a temperature of 60° C. under vacuum. The yield is 7.7 parts by weight of the neutral bromide of the condensation product.

Example III

To 25.6 parts by volume of 78% sulfuric acid are added, while stirring, 10.45 parts by weight of 3-methoxy-diphenylamine-4-diazonium chloride and, in small portions over a period of 4 hours, 1.21 parts by weight of paraformaldehyde. The mixture is then heated for 2 hours at a temperature of 40° C. and left standing for 12 hours at room temperature. It is then poured into 200 parts by volume of a saturated aqueous barium chloride solution and additional saturated barium chloride solution is added until neither a surplus of barium ions nor sulfate ions is present, i.e., until neither can be detected. The barium sulfate is removed by centrifuging, the solution is purified by treatment with a small amount of charcoal and then completely evaporated under vacuum at a temperature not exceeding 60° C. The yield obtained is 8.5 parts by weight of a mixture of about equal parts of the acid and the neutral chloride of the condensation product.

Example IV

Over a period of 15 minutes, 20 parts by weight of 4-methyl-diphenylamine-4'-diazonium sulfate are introduced into a solution of 1.96 parts by weight of paraformaldehyde in 42 parts by volume of 78 percent sulfuric acid. The mixture is stirred, first for 1 hour at room temperature, then for 1.5 hours at 40° C. and is then left standing overnight at room temperature. After diluting with 150 parts by volume of water, a saturated barium chloride solution is added to the reaction mixture until neither an excess of barium ions nor sulfate ions can be detected. After separation of the barium sulfate, the solution is completely evaporated under vacuum at temperatures not exceeding 60° C.

14.3 parts by weight of the condensation product, i.e. a mixture of acid and neutral chloride, are thus obtained.

Example V

Over a period of 60 minutes, 23.4 parts by weight of 4-methoxy-diphenylamine-4'-diazonium sulfate are introduced into a solution of 1.67 parts by weight of paraformaldehyde in 35 parts by volume of 78 percent sulfuric acid. The mixture is stirred, first for 1 hour at room temperature and then for another hour at 40° C., and then left standing over night. Thereafter, the mixture is diluted with 230 parts by volume of water and barium chloride is added, while cautiously heating, until equivalent quantities of barium and sulfate ions are present in the mixture. After separation of the barium sulfate, the solution is completely evaporated under vacuum. The yield is 15 parts by weight of the condensation product, i.e. a mixture of neutral and acid chloride.

It will be obvious to those skilled in the art that many modifications may be made within the scope of the present invention without departing from the spirit thereof, and the invention includes all such modifications.

What is claimed is:

1. A process for the preparation of a polyfunctional diazonium halide which comprises condensing a diphenylamine-4-diazonium salt selected from the group consisting of a halide and a sulfate with formaldehyde in solution in sulfuric acid, adding a solution of a barium halide to the reaction solution to convert sulfuric acid and sulfate ions to metal sulfates of low solubility, separating precipitated sulfates, and recovering the condensation product from the reaction solution.

2. A process according to claim 1 in which the condensation product is recovered by evaporating the reaction solution to dryness.

3. A process according to claim 1 in which the diphenylamine-4-diazonium salt is a diphenylamine-4-diazonium halide.

4. A process according to claim 1 in which the barium halide is added in an amount equivalent to the diazonium groups and the metal sulfates are formed by the addition of a carbonate of a metal of Group II of the Periodic System.

References Cited in the file of this patent

UNITED STATES PATENTS

| 2,063,631 | Schmidt et al. | Dec. 8, 1936 |
| 2,679,498 | Seven et al. | May 25, 1954 |
| 2,734,085 | Adams et al. | Feb. 7, 1956 |

FOREIGN PATENTS

| 220,025 | Great Britain | July 28, 1924 |

OTHER REFERENCES

Saunders: The Aromatic Diazo Compounds (1949), page 41.

Kolthoff and Sandell: Textbook of Quantitative Inorganic Analysis (1952).